United States Patent
Ott et al.

(10) Patent No.: US 8,475,025 B2
(45) Date of Patent: Jul. 2, 2013

(54) LIGHT-EMITTING DEVICE

(75) Inventors: Hubert Ott, Bad Abbach (DE); Alfred Lell, Maxhuette-Haidhof (DE); Uwe Strauss, Bad Abbach (DE); Volker Haerle, Laaber (DE); Norbert Stath, Regensburg (DE)

(73) Assignee: OSRAM Opto Semiconductors GmbH, Regensburg (DE)

( * ) Notice: Subject to any disclaimer, the term of this patent is extended or adjusted under 35 U.S.C. 154(b) by 902 days.

(21) Appl. No.: 12/520,630

(22) PCT Filed: Dec. 14, 2007

(86) PCT No.: PCT/DE2007/002263
§ 371 (c)(1),
(2), (4) Date: Nov. 12, 2009

(87) PCT Pub. No.: WO2008/077380
PCT Pub. Date: Jul. 3, 2008

(65) Prior Publication Data
US 2010/0066254 A1 Mar. 18, 2010

(30) Foreign Application Priority Data
Dec. 22, 2006 (DE) .................. 10 2006 061 164

(51) Int. Cl.
*F21V 7/04* (2006.01)
(52) U.S. Cl.
USPC ............... 362/556; 362/23.16; 362/23.17; 362/559; 362/561; 362/582

(58) Field of Classification Search
USPC .......... 362/26, 27, 556, 559, 561, 582, 23.09, 362/23.1, 23.16, 23.17, 600, 602–605; 385/123
See application file for complete search history.

(56) References Cited

U.S. PATENT DOCUMENTS

| | | | |
|---|---|---|---|
| 5,187,765 A * | 2/1993 | Muehlemann et al. | 362/554 |
| 5,307,245 A * | 4/1994 | Myers et al. | 362/554 |
| 5,542,016 A | 7/1996 | Kaschke | |
| 5,606,634 A | 2/1997 | LeBihan | |
| 6,030,108 A | 2/2000 | Ishiharada et al. | |
| 6,086,235 A | 7/2000 | Chen | |

(Continued)

FOREIGN PATENT DOCUMENTS

| CN | 1093846 A | 10/1994 |
|---|---|---|
| DE | 43 26 525 A1 | 2/1994 |

(Continued)

OTHER PUBLICATIONS

Notification of the First Office Action and Text of the First Office Action, Issue Date Apr. 14, 2010, Chinese Application No. or Patent No. 200780047636.X, 9 pages.

(Continued)

*Primary Examiner* — Stephen F Husar
(74) *Attorney, Agent, or Firm* — Slater & Matsil, L.L.P.

(57) ABSTRACT

One embodiment of the invention proposes a light-emitting device comprising a radiation source for the emission of a radiation having at least a first wavelength, and an elongated, curved light-guiding body, into which the radiation emitted by the radiation source is coupled and which couples out light at an angle with respect to its longitudinal axis on account of the coupled-in radiation having the first wavelength.

23 Claims, 6 Drawing Sheets

U.S. PATENT DOCUMENTS

| | | | |
|---|---|---|---|
| 6,299,338 B1 * | 10/2001 | Levinson et al. | 362/559 |
| 6,584,714 B1 | 7/2003 | Wehrmann et al. | |
| 7,466,896 B2 * | 12/2008 | Tao et al. | 362/556 |
| 2001/0050667 A1 | 12/2001 | Kim et al. | |
| 2003/0071934 A1 | 4/2003 | Saccomanno et al. | |
| 2007/0194693 A1 | 8/2007 | Saito et al. | |
| 2008/0089089 A1 | 4/2008 | Hama et al. | |

FOREIGN PATENT DOCUMENTS

| | | |
|---|---|---|
| DE | 43 14 031 A1 | 11/1994 |
| DE | 198 53 106 A1 | 5/2000 |
| JP | 60-125806 A | 7/1985 |
| JP | 2-187702 A | 7/1990 |
| JP | 6-050841 A | 2/1994 |
| JP | 11-217000 A | 8/1999 |
| JP | 11-344417 A | 12/1999 |
| JP | 2000-047038 A | 2/2000 |
| JP | 2000-326786 A | 11/2000 |
| JP | 2002-299694 A | 10/2002 |
| JP | 2004-281280 A | 10/2004 |
| JP | 2004-342405 A | 12/2004 |
| JP | 2005-328921 A | 12/2005 |
| JP | 2006-071776 A | 3/2006 |
| JP | 2006-085972 A | 3/2006 |
| WO | WO 99/28673 | 6/1999 |
| WO | WO 00/32982 | 6/2000 |
| WO | WO 2004/106804 A2 | 12/2004 |
| WO | WO 2005/093860 A1 | 10/2005 |
| WO | WO 2006/038502 A1 | 4/2006 |

OTHER PUBLICATIONS

Römpp Chemielexikon, chemical encyclopedia, ninth extended and revised edition, Georg-Thieme-Verlag Stuttgart, p. 4259, 1992.

Drawings from Taiwan Application No. 093218837, Published Jun. 11, 2005, Publication No. M267410, 5 pages.

Drawings from Taiwan Application No. 095207084, Published Oct. 1, 2006, Publication No. M298682, 5 pages.

* cited by examiner

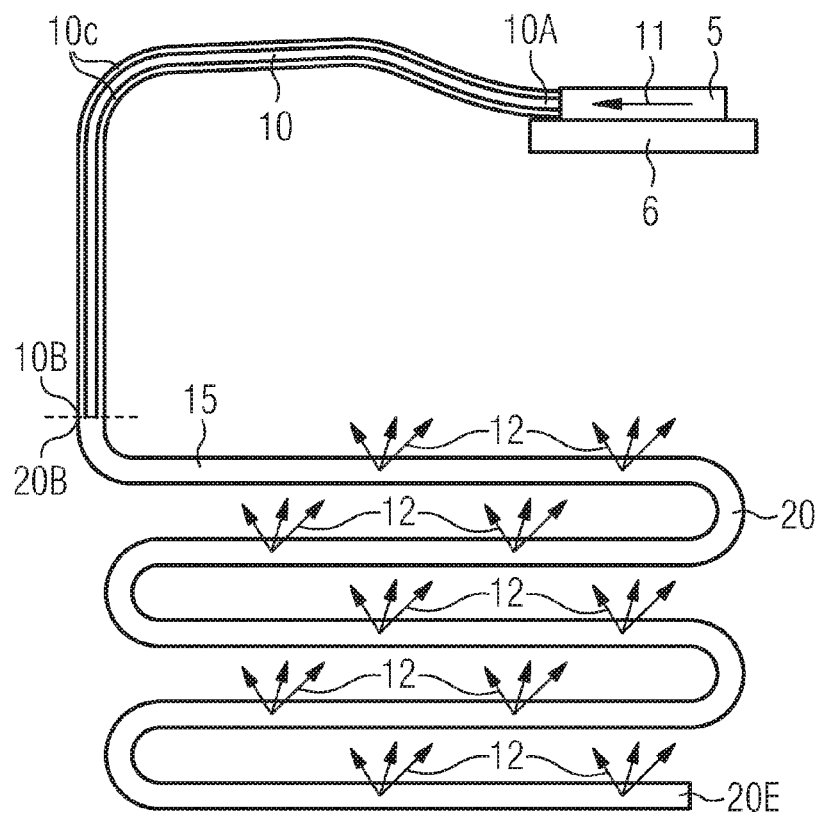
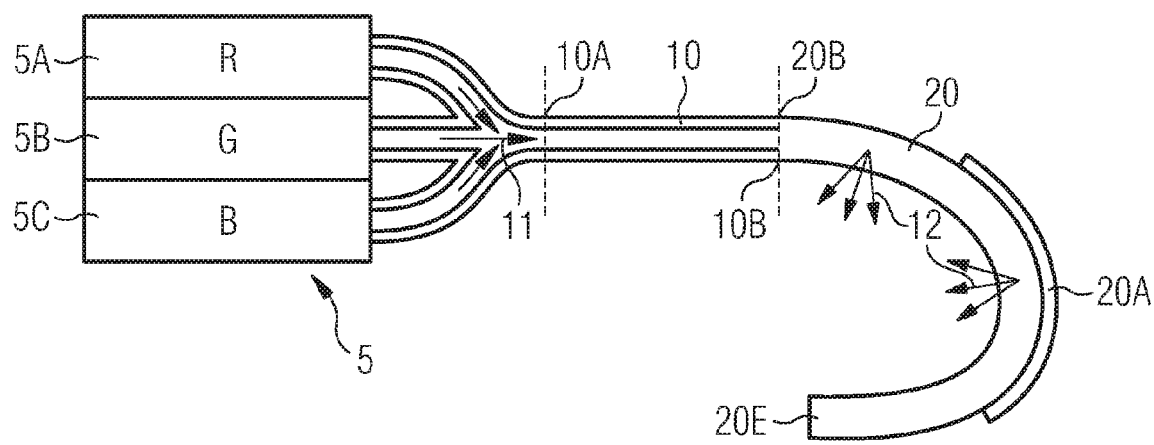

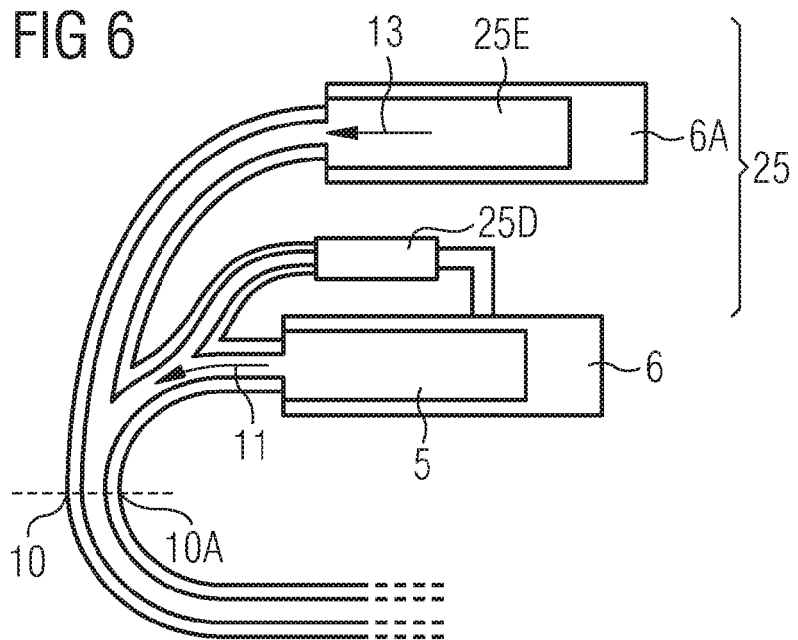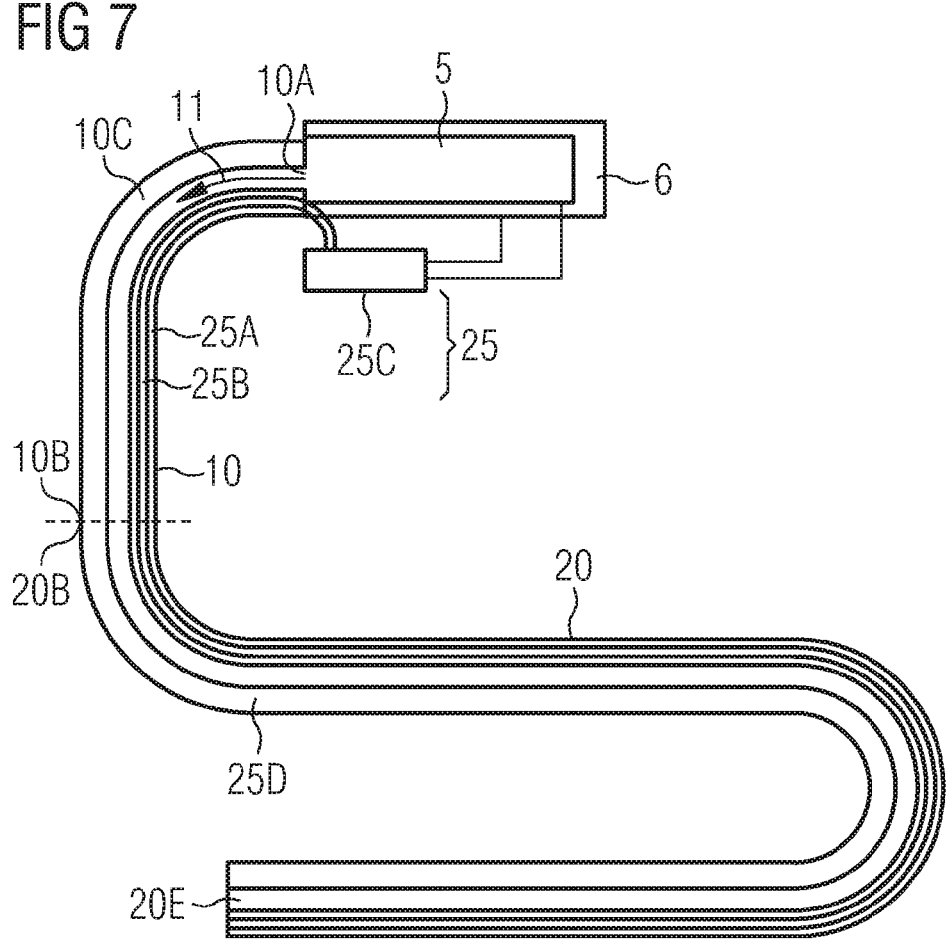

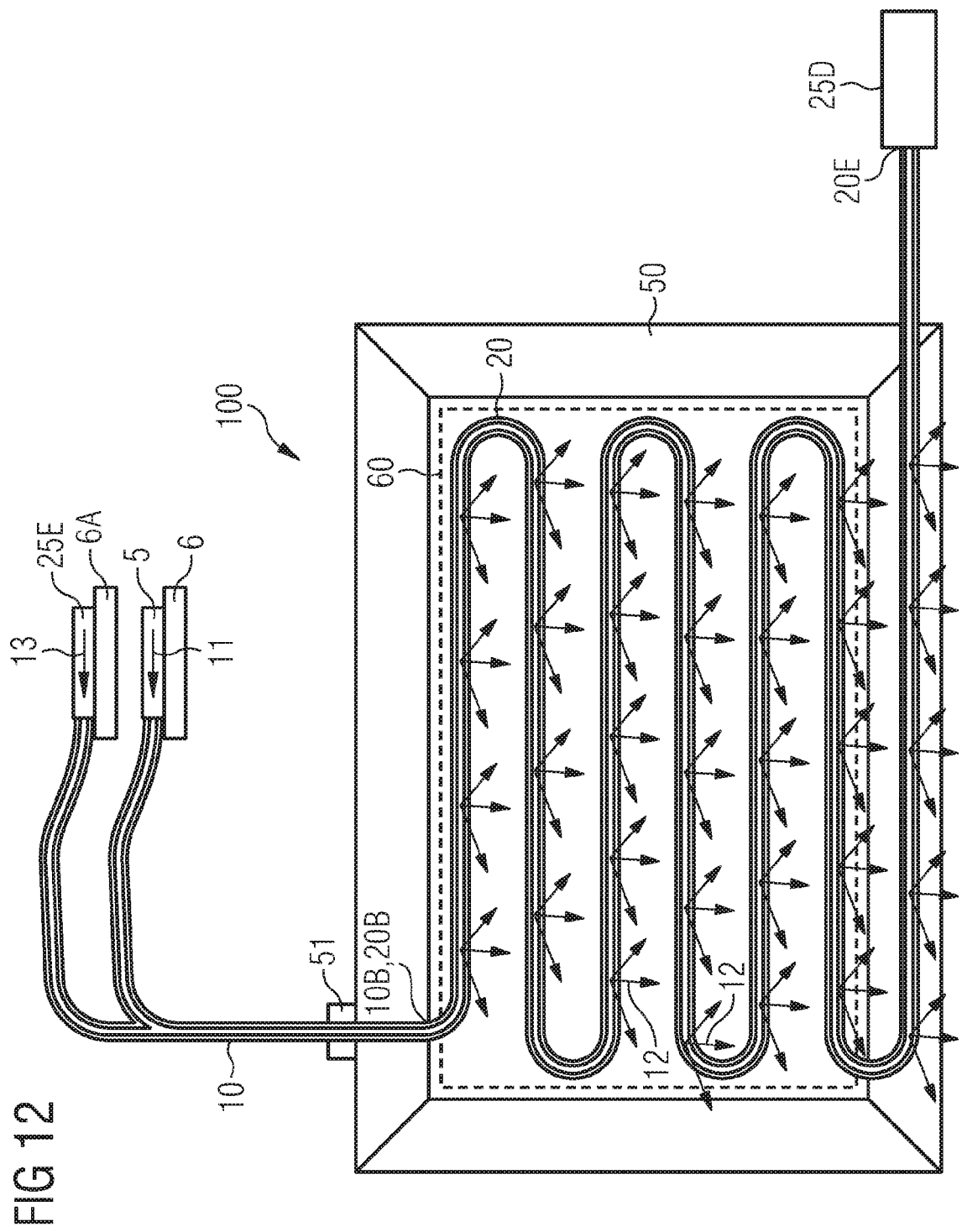

LIGHT-EMITTING DEVICE

This patent application is a 371 filing of PCT/DE2007/002263, filed Dec. 14, 2007, which claims the priority of German patent application 10 2006 061 164.0, filed Dec. 22, 2006, the disclosure content of which is hereby incorporated by reference.

TECHNICAL FIELD

The invention relates to light-emitting devices comprising a light-guiding body.

BACKGROUND

Light-emitting devices comprising a light-guiding body are known for example from the document WO 2006/038502 A1 (U.S. equivalent 2008/0089089).

SUMMARY

Specific embodiments of the invention specify further light-emitting devices comprising a light-guiding body.

One embodiment of the invention provides a light-emitting device that includes a radiation source for the emission of radiation having at least a first wavelength. The radiation source is coupled into an elongated, curved light-guiding body which couples out light at an angle with respect to its longitudinal axis on account of the coupled-in radiation having the first wavelength.

In this light-emitting device, the efficiency of the light emission can be increased by virtue of the fact that the light-guiding body is not arranged in direct proximity to the radiation-emitting radiation source, but rather is separated from the radiation source, for example, by an optical waveguide. As a result, for example, the location of the emission of the visible light is spatially separated from the location of heat generation, the radiation source, with the consequence that the operating temperature of the light-guiding body can be lowered, which can increase the reliability thereof.

The light-guiding body, which is elongated, that is to say essentially has an elongate extent, is optically coupled to the radiation source and serves both for the further transport of the radiation of the radiation source and for the emission of light preferably over the entire region formed by the longitudinal direction. In this case, the light-guiding body can be embodied as a glass rod or as a light-guiding fiber, for example, in which the light is in each case both guided and emitted towards the outside, for example, as a result of a corresponding surface treatment.

In one embodiment of the invention, the light-guiding body is optically coupled to the radiation source via an optical waveguide.

In a further embodiment of the invention, the radiation source is set up for the emission of radiation corresponding to the colors red, green and blue (RGB). By way of example, the radiation source is embodied as an RGB module. The radiation source thus feeds radiation having different wavelengths, corresponding to the colors red, green and blue, into the light-guiding body. Given corresponding intensity of the different wavelengths in the emitted radiation, it is possible to establish in total white light or light having a specific color temperature that is emitted uniformly by the light-guiding body.

In order to ensure both the transport of the light within the light-guiding body and a uniform emission, in a further embodiment reflection materials can be provided at locations of the curvature of the light-guiding body. By way of example, the light-guiding body can be coated or printed with a reflective layer in order to prevent excessive coupling-out of light energy at the curvature locations. The surface of the light-guiding body can be roughened for better coupling-out of the light. By way of example, the light-guiding body has a roughened body when fashioned as a glass fiber or plastic fiber.

In a further embodiment of the invention, the light-guiding body has a converter material, which converts the radiation transported by the optical waveguide into light having a second, longer wavelength. The light having the second, longer wavelength is emitted at an angle with respect to the longitudinal axis of the light-guiding body.

The efficiency of the light conversion can be increased by the spatial separation of the radiation-emitting radiation source from the converter material. By way of example, it is possible to reduce a reabsorption of the converted light having the longer, second wavelength by the radiation source. Furthermore, the abovementioned lowering of the operating temperature of the light-guiding body also results in a reduced temperature of the converter material, which can in turn increase the reliability thereof. Such a spacing apart of the converter material from the radiation source can also be referred to as "remote phosphor configuration". By means of the conversion, the radiation having the first wavelength can be converted into—preferably visible—light having a second wavelength, the second wavelength being greater than the first wavelength of the exciting radiation.

In a further embodiment of the invention, the radiation-emitting radiation source emits short-wave radiation within the range of 210 to 500 nm, preferably within the range of 210 nm to 420 nm, more preferably within the range of 360 nm to 420 nm, or within rather the blue range of approximately 420 nm to 500 nm. In this case, the—preferably visible—converted light having the second wavelength that is emitted after the conversion has a longer wavelength than the radiation originally emitted by the radiation source and, depending on said radiation, can lie within a wavelength range of 400 to 800 nm.

In this case, the converter material can be in particular a phosphor that can be excited by the radiation emitted by the radiation source, for example, so as to effect fluorescence. In the near UV it is possible to use, for example, oxide-based phosphors, such as barium magnesium aluminates, for example, which are doped with europium, such as $BaMgAl_{10}O_{17}:Eu^{2+}$, for example. It is also possible to use strontium magnesium aluminates, which are likewise doped with europium, such as $SrMgAl_{10}O_{17}:Eu^{2+}$ for example, and also chlorapatites with strontium, barium or calcium having the formula $(Sr, Ba, Ca)_5(PO_4)_3Cl:Eu^{2+}$. It is also possible to use barium aluminates, for example, $Ba_3Al_{28}O_{45}:Eu^{2+}$. All the compounds mentioned emit light in the blue wavelength range if they are pumped in the near UV. Green emitting phosphors are, for example, $SrAl_2O_4:Eu^{2+}$. Green to green-yellow emitting phosphors are for example chlorosilicates having the formula $Ca_8Mg(SiO_4)_4Cl_2:Eu^{2+}, Mn^{2+}$, which are doped with europium or manganese, and also thiogallates having the general formula $AGa_2S_4:Eu^{2+}, Ce^{2+}$ where A can be selected from calcium, strontium, barium, zinc and magnesium. Furthermore, for example, alkaline-earth-metal-substituted strontium sulphides having the general formula $(A, Sr)S:Eu^{2+}$ where A=alkaline earth metal ions, and also nitridosilicates having the formula $M_2Si_5N_5N_8:Eu^{2+}$ where M=Ca or Sr can be used as red emitting phosphors and converter materials.

The converter materials or phosphors can also be used in such a way that they emit visible white light upon excitation with short-wave radiation and the short-wave radiation is thus converted into visible white light. A mixture of, for example, 47% by weight of strontium chlorapatite, 48% by weight of strontium aluminate and 5% by weight of nitridosilicates can emit white light having a color locus x=0.354 and y=0.386 in the CIE standard chromaticity diagram given an excitation at 405 nm. In further embodiments of the invention, by means of the conversion of the radiation having the first wavelength, visible light having the second wavelength can also result which does not leave the observer with a white light impression, but rather has, for example, yellow, green, red or any other color. Furthermore, it is possible for light-emitting devices to emit light which is a mixture of non-converted short-wave radiation and converted light.

The optical waveguide can comprise, for example, fibers containing a material selected from glass and plastic. Consequently, the optical waveguide can also comprise fiber-optic cables or light-guiding rods. Optical waveguides based on glass are particularly well suited to coupling in and to transporting the short-wave light, for example, UV light, emitted by the radiation source in some embodiments of the invention. The optical waveguide can be constructed like a fiber, a cross section through such a fiber showing a core region having a high refractive index, which is surrounded by a cladding region having a lower refractive index than the core region. In this case, the core region is able to transport coupled-in modes of light and short-wave radiation, for example, by means of interference and reflection.

In a further embodiment of the invention, a plurality of optical waveguides can also be present, which are combined, for example, to form an optical waveguide bundle, in which case each individual optical waveguide can separately transport the radiation having the first wavelength emitted by the radiation source to the light-guiding body or to the converter material after the coupling-in. In this case, a further embodiment of a light-emitting device according to the invention can also comprise a plurality of radiation sources, it being possible, for example, for one radiation source to be present for each respective optical waveguide. The radiation having the first wavelength emitted by these radiation sources can then be concentrated by means of the optical waveguides in an optical waveguide bundle, for example, and, after the transport of the radiation through the optical waveguide bundle, can be converted into the light having the second, longer wavelength by means of the converter material. In this case, it is also possible for the radiation of the different radiation sources which is coupled into different optical waveguides to be converted into visible light having different second wavelengths by means of different converter materials, a mixture of this visible light having different wavelengths then resulting in a homogeneous white light impression for the observer.

The radiation source can comprise, for example, a short-wave radiation source, in particular a UV laser diode, for example, an N-based laser diode such as an InGaN laser diode. In particular, it is possible to use materials having the general formula $Al_xIn_yGa_zN$ where x, y, z≧0 and x+y+z=1, for example, a laser diode having an emission wavelength of 365 nm to 425 nm with an In content of 0-10 Atom % (for example, x=0; y=0-0.1; z=0.9-1.0) in the light-generating layer. UV laser diodes are particularly well suited to emitting a directional UV radiation that can readily be coupled into an optical waveguide.

The radiation source can be connected to a heat sink, for example, for the purpose of dissipating the heat loss. In this case, the radiation source can be connected directly to the heat sink, or be in thermal contact with it.

In a further embodiment, the surface of the light-guiding body is coated or printed with the converter material. In this case, the light-guiding body is configured with a diffuse material through which part of the radiation having the first wavelength or of the short-wave radiation passes from a core of the light-guiding body to the surface of the light-guiding body, where it impinges on the converter material and is converted into the light or the radiation having the second wavelength.

In a further embodiment of light-emitting devices according to the invention, the converter material can comprise nanoparticles enclosed in the light-guiding body. The advantage of nanoparticles may consist in the fact that, in the case of the nanoparticles, the light scattering is reduced and the luminous intensity of the visible light emitted by the converter material thus becomes more uniform. The nanoparticles advantageously have particle diameters which are a few nanometers, for example, between 2 and 50 nm, more preferably between 2 nm and 10 nm, since such small nanoparticles reduce light scattering of the converted visible light particularly well. Furthermore, the particle diameter can also influence the wavelength of the converted light, for example, on account of the quantum size effect. Thus, nanoparticles having relatively small diameters generate converted light having a shorter wavelength in comparison with nanoparticles having relatively large diameters.

By way of example, the nanoparticles of the converter material are enclosed in the cladding of a light-guiding body embodied as a glass fiber. Given corresponding configuration of core and cladding of the glass fiber, for example, the radiation having the first wavelength can partly emerge from the core into the cladding region, where it in turn impinges on the converter material. Consequently, part of the radiation having the first wavelength is converted into the light having the second wavelength, while the rest of the radiation having the first wavelength is transported further in the core of the glass fiber, that is to say along the longitudinal axis of the light-guiding body.

In a further exemplary embodiment of the invention, the curved light-guiding body forms a two-dimensional region. By way of example, the light-guiding body is bent in such a way that it fills a predetermined area as uniformly as possible. In this case, the light-guiding body can form areal forms which are round or rectangular or have any other polygonal form. For this purpose, the light-guiding body can be embodied in meandering or spiral or serpentine fashion, for example, within the two-dimensional region. Owing to the usually small spatial extent of the light-guiding body, particularly when embodied as a glass fiber, the region in which the light-guiding body is arranged can be made very flat. Consequently, thin planar light sources can be produced and operated with different embodiments of light-emitting devices.

Furthermore, an optical component can be present in a light-emitting device according to a further exemplary embodiment of the invention, which optical component interacts with the converted light or with a radiation having the first wavelength that emerges from the light-guiding body. The optical component can interact, for example, with the converted light or with the radiation having the first wavelength that emerges from the optical waveguide, for example, short-wave radiation, by means of scattering, refraction, reflection, deflection or diffraction. The optical component can comprise a diffusing screen, for example, which can be arranged for instance parallel to the area formed by the curved light-guiding body, or in some other way in the beam path of the light coupled out from the light-guiding body. By way of example, the converted light can be scattered over the surface area by the diffusing screen. A more uniform emission of the light can thus be achieved.

In further embodiments of a light-emitting device according to the invention, a detection device can also additionally be present, which can detect and thus indicate damage to the optical waveguide and/or the light-guiding body.

This can be particularly advantageous since it is thereby possible to rapidly detect whether the optical waveguide and/or the light-guiding body are damaged and light that is possibly harmful to the observer is thus also being emitted towards the outside.

In a particularly advantageous manner, the detection device, which can detect damage to the optical waveguide and/or the light-guiding body, also supervises a power supply (current and/or voltage supply) for the radiation-emitting radiation source and can therefore turn off the power supply in the event of damage to the optical waveguide and/or the light-guiding body, with the consequence that the potentially dangerous emission of short-wave radiation, for example, UV radiation, from the damaged optical waveguide and/or the light-guiding body is also interrupted.

By way of example, the detection device is able to switch off the power supply of the radiation-emitting radiation source depending on the detection of damage to the optical waveguide and/or the light-guiding body.

In one embodiment of the light-emitting device, the detection device comprises a second radiation source for the emission of a radiation having a third wavelength. By way of example, the second radiation source comprises a laser diode set up for the emission of red light. The second radiation source emits, for example, radiation having a wavelength within the range of 630 nm to 770 nm. Furthermore, the detection device comprises a detector for detecting the radiation having the third wavelength. In this case, detection of the radiation having the third wavelength can indicate a functionality of the optical waveguide and of the light-guiding body.

By way of example, the optical waveguide and the light-guiding body are arranged between the second radiation source and the detector. The second radiation source can couple the radiation having the third wavelength into the optical waveguide at the same end of the optical waveguide as the first radiation source, from where, given undamaged optical waveguide and light-guiding body, it is transported via the latter to the detector at a remote end of the light-guiding body. If the radiation having the third wavelength is detected in the detector, it can be assumed that both the optical waveguide and the light-guiding body are undamaged and no potentially dangerous radiation can emerge from the optical waveguide or the light-guiding body.

In another embodiment of the light-emitting device, the second radiation source and the detector are arranged at one end of the optical waveguide and the light-guiding body is arranged at another end of the optical waveguide. By way of example, it can once again be detected whether the radiation having the third wavelength emitted by the second radiation source reaches the detector. In this case, it can be assumed that, given an undamaged optical waveguide and an undamaged light-guiding body, the radiation having the third wavelength reaches the remote end of the light-guiding body essentially unimpeded, no back-radiation or reflection of the radiation having the third wavelength occurring.

However, if the optical waveguide and/or the light-guiding body has damage, for example, a fracture, reflection of the radiation having the third wavelength can occur at the damaged site. The reflected radiation having the third wavelength is transported back via the light-guiding body and/or the optical waveguide, depending on the location of the damage, to the detector and can be detected there. In this case, detection of the radiation having the third wavelength can indicate damage to the optical waveguide and/or light-guiding body.

The detection can also be made dependent on a threshold value corresponding to a low reflection of the radiation having the third wavelength given an undamaged optical waveguide and an undamaged light-guiding body. If the detected radiation having the third wavelength lies above the threshold value, damage can once again be assumed.

Damage to the optical waveguide and/or light-guiding body can be performed, for example, prior to operation of the first radiation source that effects the emission of light from the light-guiding body. By way of example, prior to operation, a short radiation pulse is emitted by the second radiation source and a detection result measured in the detector is evaluated. Consequently, prior to the operation of the light-emitting device it can be checked whether safe operation of the first radiation source can take place. Furthermore, during the operation of the device, too, it is possible for short radiation pulses to be emitted by the second radiation source and to be correspondingly detected by the detector in order also to be able to ascertain damage to the light-guiding body or optical waveguide in operation. In this case, the radiation pulses having the third wavelength are preferably so short temporally that this radiation operation is not noticed, for example, by a human observer.

By way of example, the detector can be coupled to one end of an optical waveguide in light-guiding fashion, the light-guiding body then being arranged at the other end of this optical waveguide. This optical waveguide can be part of a larger optical waveguide assemblage, for example, of an optical waveguide bundle. In this case, the other optical waveguides of the bundle can then be connected to the radiation source and, for example, only this one optical waveguide fiber can be connected to the first detector. It is also possible to fit a beam splitter in the optical waveguide, which directs at least portions of the radiation having the third wavelength that is transported back by the optical waveguide to the first detector.

The detection device, which can detect damage to the optical waveguide and/or the light-guiding body, can, for example, also comprise a first electrically conductive connection, which runs in the optical waveguide and in the light-guiding body. Furthermore, means for checking the functionality of this first electrically conductive connection are then present, the functionality of the first electrically conductive connection indicating the functionality of the optical waveguide and of the light-guiding body.

In the case of a cable-type optical waveguide and/or light-guiding body, for example, a light-guiding rod or a glass fiber, the first electrically conductive connection advantageously runs along the principal axis of the optical waveguide and/or of the light-guiding body and can thus indicate damage to the optical waveguide and/or the light-guiding body in a particularly sensitive manner. Means for checking the functionality of the first electrically conductive connection can comprise a current supply, for example, which passes an electrical pulse into the first electrically conductive connection, for example, a wire, and thus checks the length thereof over the course of the optical waveguide. The length of the first electrically conductive connection, for example of the wire, is then determined by means of the pulse reflection at the other end of the wire and the propagation time.

It is furthermore possible that a second electrically conductive connection additionally runs through the optical waveguide and the light-guiding body, which connection together with the first electrically conductive connection forms an electric circuit, and the means for checking the functionality of this first electrically conductive connection furthermore comprises a device that can detect the current flowing in the electric circuit. This can be a transistor circuit, for example, which supplies the first radiation source with power only when the electric circuit is closed and thus indicates the intactness of the optical waveguide and of the light-guiding body. The first and second electrically conductive connections can be combined, for example, at the remote end of the light-guiding body to form a current loop, for example, by means of a metal sleeve or a metal ring.

It is also possible that the second electrically conductive connection runs through the optical waveguide at a distance from the first electrically conductive connection and the means for checking the functionality of the first electrically conductive connection can detect a voltage present between the first and second electrical connections.

By way of example, it is possible to measure the capacitor effect between the first and second electrically conductive connections that are spaced apart from one another, and thus to check the intactness of the optical waveguide and/or of the light-guiding body by means of a capacitance change or RC resonance shift.

The optical waveguide and the light-guiding body advantageously have a cladding region and a core region, the electrically conductive connections being more brittle than the respective core region. In this case, it is then ensured that in the event of mechanical loading, the electrically conductive connections are interrupted before the optical waveguide and/or the light-guiding body actually breaks or is damaged. In this case, the electrically conductive connections can also run on or in the cladding region of the optical waveguide and/or of the light-guiding body, or run, for example, between the cladding region and the core region. The electrically conductive connections can be arranged in or on the optical waveguide also peripherally around the latter, such that a mechanical loading that loads the optical waveguide can then advantageously also be detected from different directions. This also applies analogously to the light-guiding body. The electrically conductive connections can also be made so thin that they preferably break before the optical waveguide and/or the light-guiding body, in particular, the respective core regions, break.

Brittleness is generally understood to mean the property of solids to break apart when subjected to stress, instead of incurring plastic or elastic deformation. In this connection, reference is made to the keyword "brittleness" in the Römp Chemielexikon [chemical encyclopedia], ninth extended and revised edition, Georg-Thieme-Verlag Stuttgart, the entire contents of which are incorporated herein by reference.

Further embodiments of the invention also relate to an illumination device comprising one of the abovementioned light-emitting devices. Such an illumination device can be, for example, a lamp, table luminaire, ceiling luminaire or any other illumination devices which are preferably embodied as planar light sources.

A further embodiment of the invention also relates to a display comprising one of the abovementioned light-emitting devices. A light-emitting device which emits light areally according to the display area of the display is particularly advantageously used as a component of such a display. Such areal illumination is, for example, particularly suitable for LCD backlighting.

Consequently, the invention according to further embodiments also relates to displays in which the backlighting contains a light-emitting device as described above. The displays are preferably not themselves emissive and are, for example, liquid crystal displays having a liquid crystal matrix.

BRIEF DESCRIPTION OF THE DRAWINGS

The invention will be explained in even more detail below on the basis of exemplary embodiments and figures. The figures are schematic drawings that are not true to scale. In the various figures, elements provided with identical reference symbols identify identical or identically acting elements.

FIGS. 1 and 2 show different embodiments of light-emitting devices according to the invention;

FIGS. 5 to 7 show different embodiments of light-emitting devices with a detection device;

FIG. 12 shows an exemplary embodiment of an illumination device with a light-emitting device according to the invention.

DETAILED DESCRIPTION

Figure 3:
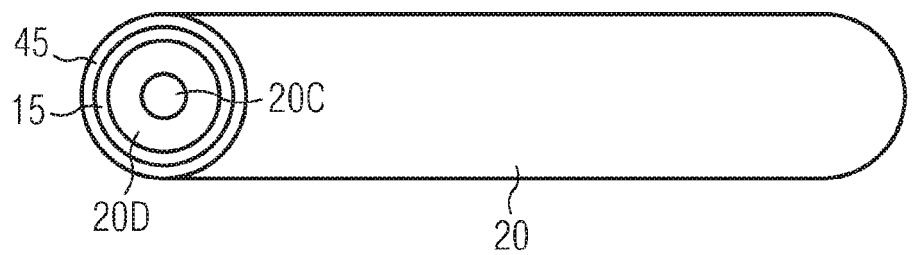
FIGS. 3 and 4 show different embodiments of a light-guiding body with converter material.

FIG. 1 shows a light-emitting device, in which a radiation source 5, for example, a UV diode laser, which is thermally conductively connected to a heat sink 6, emits short-wave radiation 11 (for example, UV radiation), which is coupled into an optical waveguide 10. In this case, the short-wave light 11 emitted by the radiation source 5 is coupled in at one end 10A of the optical waveguide 10. The optical waveguide 10 also comprises a cladding region 10C, the short-wave radiation 11 transported by the optical waveguide 10 is coupled out from the optical waveguide 10 at the second end 10B of the optical waveguide 10 and coupled into one end 20B of a light-guiding body 20. The end 10B of the optical waveguide 10 and the end 20B of the light-guiding body 20 are thus optically coupled to one another.

The light-guiding body 20, for example, an elongated, elongate glass rod or a glass fiber has a curvature and is embodied in meandering or serpentine fashion. The light-guiding body 20 is thus embodied in areal fashion and forms a two-dimensional region. The light-guiding body 20 comprises a converter material 15, by means of which the short-wave radiation 11 fed via the optical waveguide 10 is converted into visible light having a longer wavelength 12.

In this case, the light-guiding body 20 simultaneously transports the radiation 11 along the longitudinal axis of the light-guiding body 20, such that a uniform light emission of the converted light 12 can be effected over the entire length of the light-guiding body 20 as far as the second end 20E.

The surface of the light-guiding body 20 can be roughened in order to bring about a scattering of the converted light 12.

FIG. 2 shows a further exemplary embodiment of a light-emitting device. In this case, the radiation source 5 is set up for the emission of radiation corresponding to colors red, green and blue and has a module 5A for generating red light, a module 5B for generating green light and a module 5C for generating blue light. The radiation 11 coupled into the optical waveguide 10 by the radiation source 5 comprises light having different wavelengths corresponding to the radiation emitted by the modules 5A, 5B, 5C. By way of example, for the radiation 11 this results in white light or light having a specific color temperature which is transported via the optical waveguide 10 into the light-guiding body 20 for emission there.

The light-guiding body 20 is embodied, for example, as a bent or curved glass rod or as a light-guiding fiber composed of glass or plastic. In this case, the light-guiding body 20 is configured in such a way that the radiation 11 is both transported from one end 20B to the other end 20E and emitted as light 12 at an angle with respect to the longitudinal axis, for example, transversely with respect to the longitudinal axis of the light-guiding body 20. At specific locations the light-guiding body 20 can have a reflection layer 20A, which prevents an excessively large portion of the radiation 11 or of the light 12 from being emitted at the location. A uniform emission of the light 12 is thus achieved.

The form of the light-guiding body 20 as illustrated in FIG. 2 is embodied as a simple arc in this exemplary embodiment. However, other two-dimensional regions can also be formed by the light-guiding body 20, for example, in the case of a meandering or serpentine embodiment corresponding to the exemplary embodiment in FIG. 1.

FIG. 3 shows an exemplary embodiment of a light-guiding body 20 embodied as a glass fiber. The light-guiding body 20 or the glass fiber has a core 20C and a cladding 20D, which are illustrated as a cross section of an elongated glass fiber. Furthermore, a layer with converter material 15 is provided at the surface of the light-guiding body 20, by means of which layer the radiation 11 having the first wavelength is converted into light having a second, longer wavelength. Furthermore, a further layer 45 is provided on the glass fiber 20, which reflects a radiation 11 having the first wavelength and is transmissive to the light 12 having the second wavelength. The surface of the light-guiding body 20 can be coated or printed, for example, with the converter material 15.

Refractive indices of core region 20C and cladding region 20D can be embodied in such a way that not only is the radiation 11 transported or conducted by reflection and interference in the core region 20C but also parts of the radiation 11 impinge through the cladding region 20D on the layer with the converter material 15, in order to generate the light having the second, longer wavelength there. The layer 45 makes it possible for the converted light 12 to be able to emerge from the light-guiding body 20, but at the same time prevents potentially dangerous short-wave radiation 11 from being emitted from the light-guiding body 20.

Figure 4:
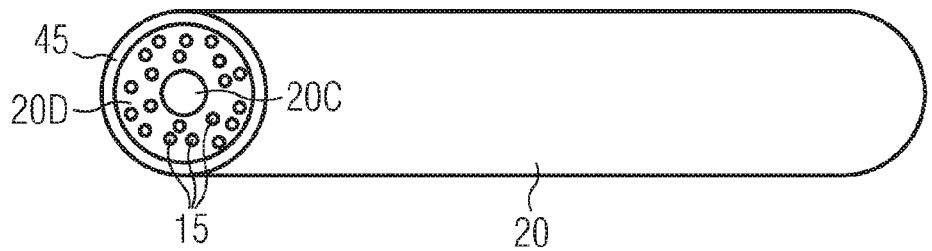

FIG. 4 shows a further exemplary embodiment of a light-guiding body 20 embodied as a glass fiber. In this case, converter material 15 comprising nanoparticles in this exemplary embodiment is provided in the cladding region 20D. The light-guiding body 20 once again comprises a layer 45 that is opaque to the radiation 11 having the first wavelength and is transmissive to the light 12 having the second wavelength.

Figure 5:
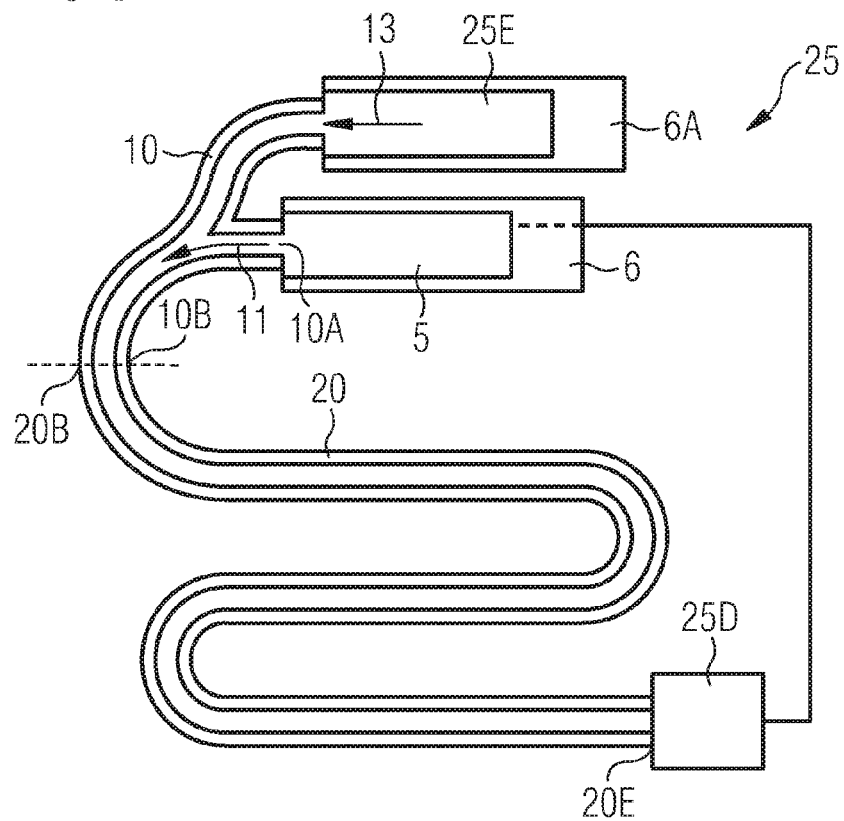

The embodiment of a light-emitting device as illustrated in FIG. 5 comprises a detection device 25, which can detect damage to the optical waveguide 10 and/or the light-guiding body 20. For this purpose, the detection device 25 has a second radiation source 25E for the emission of a radiation 13 having a third wavelength, which is in thermal contact with a further heat sink 6A. Furthermore, a detector 25D for detecting the radiation 13 having the third wavelength is provided at the remote end 20E of the light-guiding body 20. The radiation 13 having the third wavelength is coupled into the optical waveguide 10 instead of or in addition to the radiation 11 having the first wavelength, in order to be transported via the optical waveguide 10 and the light-guiding body 20 to the detector 25D.

Given an undamaged optical waveguide 10 and an undamaged light-guiding body 20, the detector 25D can detect the radiation having the third wavelength in a sufficient intensity. However, if the optical waveguide 10 or the light-guiding body 20, or the optical waveguide 10 and the light-guiding body 20 have damage, for example a fracture, the detector 25D cannot detect the radiation 13 having the third wavelength or can only detect it in a low intensity. In this case, damage to the light-guiding elements 10, 20 can be deduced and, by way of example, a power supply of the radiation source 5 can be shut off by means of a coupling of the detector 25D to the first radiation source 5. Consequently, for example, the emission of potentially harmful radiation 11 from the light-emitting device can be prevented.

The second radiation source 25E can be embodied, for example, as a laser for emitting red laser light. A test for damage to the light-guiding elements 10, 20 can be carried out both before and during operation of the first radiation source 5.

FIG. 6 shows a further exemplary embodiment of a light-emitting device with a detection device 25, in which the second radiation source 25E and the detector 25D are arranged at one end 10A of the optical waveguide 10. A light-guiding body 20, which is not illustrated in the figure, is arranged at another end 10B—likewise not shown—of the optical waveguide 10.

In this embodiment, the fact of whether damage to the light-guiding elements 10, 20 is present can be determined by means of the detector 25D on the basis of a reflected radiation 13 having the third wavelength. By way of example, in the event of damage to the optical waveguide 10 and/or the light-guiding body 20, increased reflection of the radiation 13 can occur, which can be detected by the detector 25D, for example, depending on a threshold value. If the detection device 25 ascertains damage to the light-guiding elements 10, 20, it is possible, in a similar manner to the exemplary embodiment of FIG. 5, for a current or voltage supply of the first radiation source 5 to be shut off in order to prevent the emergence of dangerous radiation from the light-emitting device.

FIG. 7 shows another embodiment of a light-emitting device according to the invention, in which a detection device 25 is present, which can detect damage to the optical waveguide 10. In this case, a first electrical connection 25A formed as a wire and a second electrically conductive connection 25B likewise formed as a wire run parallel to one another in the cladding region 10C of the optical waveguide 10 and/or the cladding region 20D of the light-guiding body 20. The two electrically conductive connections 25A and 25B are joined together to form an electric circuit and are in electrical contact with the means 25C for checking the functionality of the electrically conductive connection. It can be inferred from FIG. 7 that the means 25C, for example, a transistor circuit, simultaneously supervise the power supply for the radiation source 5. If the closed electric circuit composed of the electrically conductive connections 25A and 25B is interrupted on account of damage to the optical waveguide 10 and/or to the light-guiding body 20, the power supply for the radiation source 5 can thus also be immediately shut off and the emission of potentially harmful short-wave radiation 11 (for example UV radiation) from the light-emitting device can thus be prevented.

Figure 8A:
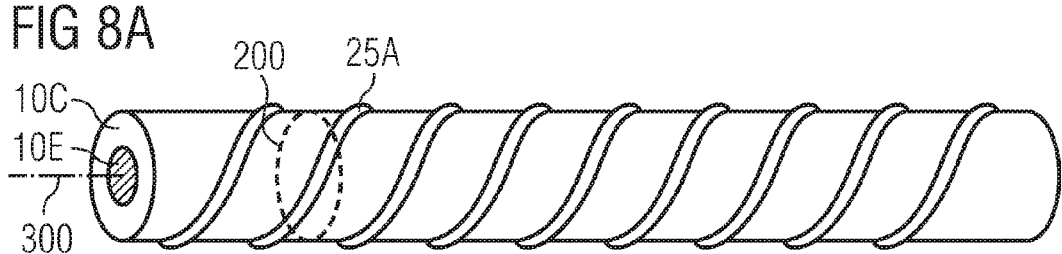
FIGS. 8A to 10B show different embodiments of light-guiding elements with electrically conductive connections.
Figure 8B:
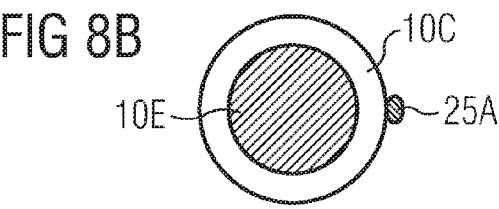

FIGS. 8A and 8B show an optical waveguide 10 comprising a core region 10E and a cladding region 10C surrounding the core region 10E, the core region having a higher refractive index than the cladding region. The core region 10E can conduct light or radiation, for example, short-wave radiation, by reflection and interference. A first electrically conductive connection 25A is present on the surface of the cladding region 10C, which connection winds around the cladding region 10C or is arranged peripherally around the optical waveguide 10 and can thus detect possible damage or a fracture of the optical waveguide 10 at a wide variety of locations. FIG. 8B is in this case a cross section through the optical waveguide at the position marked by 200. Instead of one electrically conductive connection 25A, two electrically conductive connections could also run on the cladding region 10C in this way, in which case they then form a closed electric circuit, for example, as described above or it is possible to determine the capacitor effect between the connections running parallel and damage to the optical waveguide 10 could thus be detected.

Figure 9A:
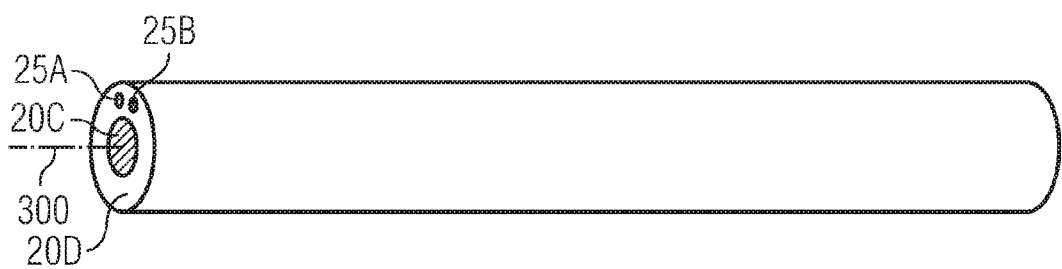
Figure 9B:
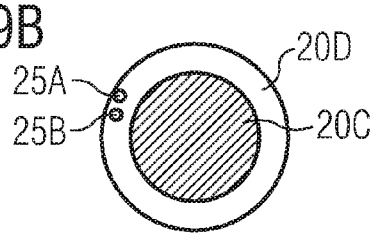

In contrast to FIGS. 8A and 8B, in the case of the optical waveguide shown in FIGS. 9A and 9B, a first electrically conductive connection 25A and a second electrically conductive connection 25B run in the cladding region 20D of the light-guiding body 20. FIG. 9B is again a cross section through the light-guiding body 20 shown in FIG. 9A. Instead of two electrically conductive connections 25A and 25B, it is also possible for just one electrically conductive connection to run through the cladding region 20D. In this case, the two electrically conductive connections can for example run parallel to the principal axis 300 of the light-guiding body 20, or else be wound around it as shown in FIGS. 8A and 8B.

Figure 10A:
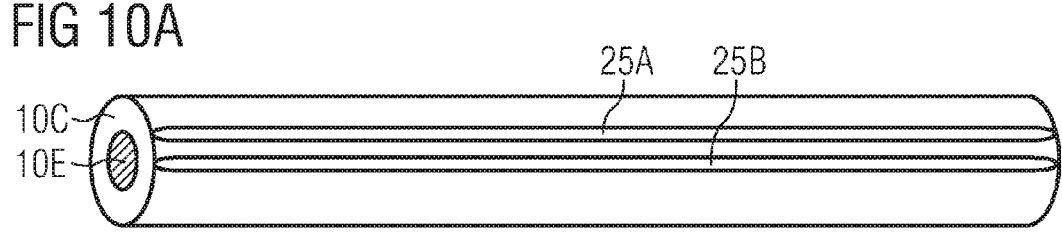
Figure 10B:
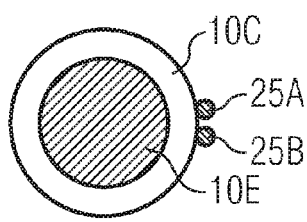

In the case of the optical waveguide shown in FIG. 10A and in cross section in FIG. 10B, a first electrically conductive connection 25A and, parallel thereto, a second electrically conductive connection 25B run on the surface of the cladding region 10C of the optical waveguide 10. These electrically conductive connections can, for example, be joined together to form an electric circuit as described above or a capacitor effect that occurs in the case of these parallel connections that can be measured and damage to the optical waveguide can thus be reliably detected.

Figure 11:
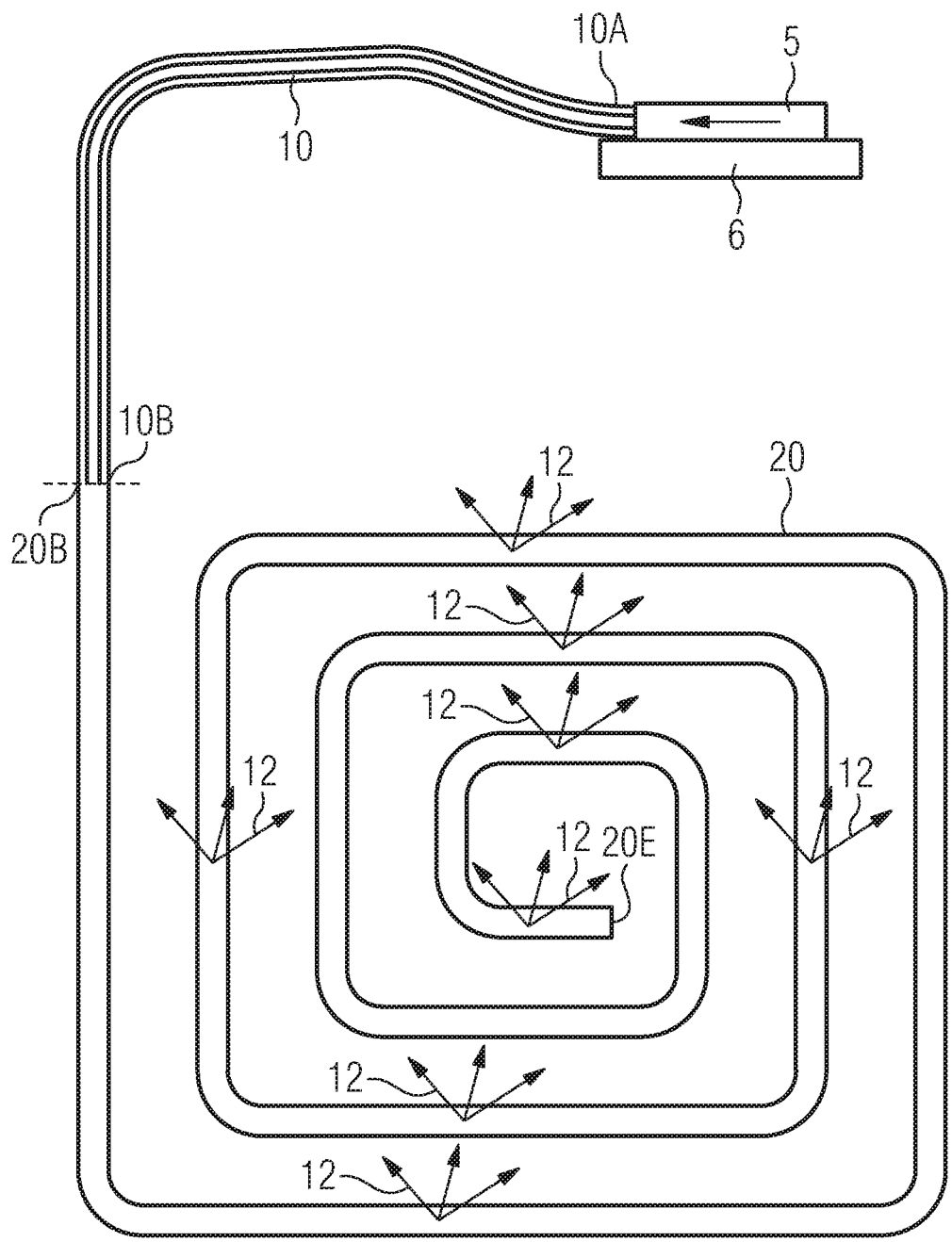
FIG. 11 shows a further embodiment of a light-emitting device.

FIG. 11 shows a further exemplary embodiment of a light-emitting device. In contrast to the light-emitting device illustrated in FIG. 1, the light-guiding body 20 is embodied in spiral fashion. In this case, the radiation source 5 can once again be embodied as an RGB module which emits the radiation 11 as essentially white light that is emitted as light 12 via the spiral light-guiding body 20. As an alternative, the radiation source 5 can be embodied as a UV diode laser in order to emit short-wave radiation 11 (for example, UV radiation) that is transported via the optical waveguide 10 to the light-guiding body 20, where it impinges on converter material 15 comprised by the light-guiding body 20. In this case, the short-wave radiation 11 is converted into light having a longer wavelength 12.

FIG. 12 shows an exemplary embodiment of an illumination device 100, in which a light-emitting device in accordance with one embodiment of the invention is integrated. In this case, too, the short-wave radiation emitted by the radiation source 5 is coupled into an optical waveguide 10 at one end 10A of the optical waveguide 10 and is fed into the light-guiding body 20 after transport through the optical waveguide 10 at the other end 10B of the optical waveguide 10. The light-guiding body 20 again has converter material 15, for example, which converts the short-wave radiation 11 into light having a longer wavelength 12. The light-guiding body 20 is arranged areally in a back projection unit 50. In this exemplary embodiment, the light-guiding body 20 forms a rectangular area corresponding, for example, to a screen area of a display. An optical element 60 is additionally provided in this exemplary embodiment, which optical element is embodied as a diffusing screen, for example, and is arranged in the beam path of the light coupled out from the light-guiding body 20. An even more uniform emission of the converted light 12 can be achieved by means of the optical component 60.

The back projection unit 50 has a fiber fixing 51, for example, by means of which it is possible to achieve a mechanical fixing of the optical waveguide 10 in the back projection unit 50.

A second radiation source 25E for the emission of radiation having a third wavelength 13 and a detector 25D for detecting the radiation 13 are additionally provided in the illumination device 100 illustrated in FIG. 12. As described in FIG. 5, for example, the detection device 25 can ascertain damage to the optical waveguide 10 and/or the light-guiding body 20 in order to prevent emergence of potentially dangerous radiation from the illumination device 100.

In the case of light-emitting devices in accordance with one of the exemplary embodiments illustrated, the radiation source 5, for example, a laser, can be spatially separated from the actual luminaire formed by the light-guiding body 20. This facilitates, for example, the maintenance and accessibility of illumination devices comprising such light-emitting devices. By way of example, as a result of the spatial separation, it is also possible, for example, to exchange the light source or driving electronics in a maintenance region provided, while the actual luminous means, the light-guiding body 20, is situated, for example, in a space that is difficult or laborious to access, such as, for example, a clean room, an explosion-protected space, a lighthouse, a transmission mast or the like. The spatial separation and the maintenance simplified thereby can also be utilized in displays, in particular liquid crystal displays in often frequented traffic areas or high building positions.

The possibility of embodying the light-guiding body 20 with thin glass fibers or other thin light-guiding elements makes it possible to utilize, in particular, planar light sources with flat designs as illumination device. By way of example, it is possible to realize large-area spatial illuminations which bring about a uniform light radiation.

The invention is not restricted to the embodiments illustrated here. In particular, the features shown in specific embodiments can also be implemented in the other embodiments. Further variations are possible, for example, also with regard to the geometrical configuration of the light-guiding body 20.

The invention claimed is:

1. A light-emitting device comprising:
a radiation source for emission of radiation having at least a first wavelength; and
an elongated, curved light-guiding body, wherein the radiation emitted by the radiation source is coupled into the light-guiding body and wherein the light-guiding body couples out light at an angle with respect to a longitudinal axis of the light-guiding body,
an optical waveguide, the radiation having the first wavelength being coupled into the light-guiding body via the optical waveguide; and
a detection device that can detect damage to the optical waveguide and/or the light-guiding body.

2. The device according to claim 1, wherein the radiation source is set up for the emission of radiation corresponding to the colors red, green and blue.

3. The device according to claim 1, wherein the light-guiding body has a converter material, which converts the radiation having the first wavelength into light having a second, longer wavelength.

4. The device according to claim 3, wherein the radiation source comprises a short-wave radiation source.

5. The device according to claim 3, wherein the converter material comprises a compound selected from the group consisting of:
$Ca_8Mg(SiO_4)_4Cl_2:Eu^{2+}$, $Mn^{2+}$; $Y_2O_3:Eu^{2+}$, $Bi^{3+}$; $(Sr, Ba, Ca)_5(PO_4)_3Cl:Eu^{2+}$; $BaMgAl_{10}O_{17}:Eu^{2+}$; $SrMgAl_{10}O_{17}:Eu^{2+}$; $Ba_3Al_{28}O_{45}:Eu^{2+}$; $(Sr, Ba)_2Al_6O_{11}:Eu^{2+}$; $SrAl_2O_4:Eu^{2+}$; $M_2Si_5N_5N_8:Eu^{2+}$ where M=Ca or Sr; $AGa_2S_4:Eu^{2+}$; $Ce^{2+}$ where A is selected from Ca, Sr, Ba, Zn and Mg; $(A,Sr)S:Eu^{2+}$ where A=alkaline earth metal ions; and $BaMg_2Al_{16}O_{27}:Eu^{2+}$.

6. The device according to claim 3, wherein a surface of the light-guiding body is coated or printed with the converter material.

7. The device according to claim 3, wherein the converter material comprises nanoparticles enclosed in the light-guiding body.

8. The device according to claim 3, wherein a layer that reflects radiation having the first wavelength and is transmissive to the light having the second wavelength is provided at or on the light-guiding body.

9. The device according to claim 1, wherein the light-guiding body comprises a glass fiber.

10. The device according to claim 1, wherein the light-guiding body forms a two-dimensional region.

11. The device according to claim 10, wherein the light-guiding body is embodied in meandering or spiral or serpentine fashion.

12. The device according to claim 1, further comprising an optical component arranged in a beam path of the light coupled out from the light-guiding body.

13. The device according to claim 1, wherein the surface of the light-guiding body is roughened.

14. The device according to claim 1, wherein the optical waveguide comprises fibers containing glass or plastic.

15. The device according to claim 1, wherein the detection device comprises a second radiation source for the emission of radiation having a third wavelength and a detector for detecting the radiation having the third wavelength, the detection of the radiation having the third wavelength indicating a functionality of the optical waveguide and/or the light-guiding body.

16. The device according to claim 15, wherein the optical waveguide and the light-guiding body are arranged between the second radiation source and the detector.

17. The device according to claim 15, wherein the second radiation source and the detector are arranged at one end of the optical waveguide and the light-guiding body is arranged at another end of the optical waveguide.

18. The device according to claim 1, further comprising
an electrically conductive connection that runs in the optical waveguide and in the light-guiding body; and
means for checking the functionality of the electrically conductive connection the functionality of the electrically conductive connection providing information related to the functionality of the optical waveguide and of the light-guiding body.

19. The device according to claim 1, wherein the detection device is set up for switching off a power supply of the radiation source depending on the detection of damage to the optical waveguide and/or the light-guiding body.

20. An illumination device comprising:
a radiation source for emission of radiation having at least a first wavelength;
an elongated, curved light-guiding body, wherein the radiation emitted by the radiation source is coupled into the light-guiding body and wherein the light-guiding body couples out light at an angle with respect to its longitudinal axis;
a housing unit enclosing at least the light-guiding body such that the light coupled out of the light-guiding body can serve as an illumination source;
an optical waveguide, having the first wavelength being coupled into the light-guiding body via the optical waveguide; and
a detection device that can detect damage to the optical waveguide and/or the light-guiding body.

21. A display comprising:
a radiation source for emission of radiation having at least a first wavelength;
an elongated, curved light-guiding body, wherein the radiation emitted by the radiation source is coupled into the light-guiding body and wherein the light-guiding body couples out light at an angle with respect to its longitudinal axis;
an optical waveguide, having the first wavelength being coupled into the light-guiding body via the optical waveguide;
a detection device that can detect damage to the optical waveguide and/or the light-guiding body; and
a screen area located adjacent the light-guiding body.

22. The display according to claim 21, further comprising a liquid crystal matrix arranged in a beam path of the light coupled out of the light-guiding body.

23. A light-emitting device comprising:
a radiation source for emission of radiation having at least a first wavelength;
an elongated, curved light-guiding body, wherein the radiation emitted by the radiation source is coupled into the light-guiding body and wherein the light-guiding body couples out light at an angle with respect to a longitudinal axis of the light-guiding body; and
a detection device that can detect damage to the light-guiding body.

* * * * *

UNITED STATES PATENT AND TRADEMARK OFFICE
CERTIFICATE OF CORRECTION

PATENT NO. : 8,475,025 B2  Page 1 of 1
APPLICATION NO. : 12/520630
DATED : July 2, 2013
INVENTOR(S) : Ott et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1046 days.

Signed and Sealed this
Eighth Day of September, 2015

Michelle K. Lee
*Director of the United States Patent and Trademark Office*